United States Patent [19]

McClelland et al.

[11] Patent Number: 4,831,257
[45] Date of Patent: May 16, 1989

[54] GATE COUPLED INPUT CIRCUIT

[75] Inventors: Jeff L. McClelland, Lowell; Shigesato Iwasa, Harvard; Neal R. Butler, Acton, all of Mass.

[73] Assignee: Honeywell Inc., Minneapolis, Minn.

[21] Appl. No.: 912,883

[22] Filed: Sep. 26, 1986

[51] Int. Cl.[4] .................................. G01J 1/44
[52] U.S. Cl. ............................ 250/338.1; 250/332; 250/338.3; 307/296.1; 330/296; 357/30
[58] Field of Search .............. 250/332, 330, 336.1, 250/338.3, 338.1, 349, 370.01, 370.14; 307/296 R, 296 A; 330/296, 51; 357/25, 30, 32

[56] References Cited

U.S. PATENT DOCUMENTS

| | | | |
|---|---|---|---|
| 3,848,143 | 11/1974 | Millington et al. | 330/296 |
| 3,932,753 | 1/1976 | Stotlar | 250/332 |
| 3,961,280 | 6/1976 | Sampei | 330/296 |
| 3,987,317 | 10/1976 | Hongu et al. | 330/296 |
| 4,110,616 | 8/1978 | Porter et al. | 250/332 |
| 4,194,136 | 3/1980 | Butler | 307/296 P |
| 4,341,012 | 7/1982 | Fripp et al. | 250/332 |
| 4,354,109 | 10/1982 | Gelpey et al. | 250/332 |
| 4,500,797 | 2/1985 | Nishimoto | 307/296 R |
| 4,626,687 | 12/1986 | Nara et al. | 250/338.3 |
| 4,659,928 | 4/1987 | Tew | 250/332 |
| 4,691,104 | 9/1987 | Murata et al. | 250/338.3 |

FOREIGN PATENT DOCUMENTS 0131731 10/1980 Japan ................... 250/338.3

OTHER PUBLICATIONS

Nirschl, "A Radiation Activated Sensor," *Nuclear Instruments & Methods* vol. 115, No. 1, Feb. 15, 1974, pp. 173–180.

Grant et al. "Integrated CCD-Bipolar Structure for Focal Plane Processing of IR Signals," *Int'l Conference on the Application of CCD's*, Oct. 29–31, 1975, pp. 53–58.

Primary Examiner—Janice A. Howell
Assistant Examiner—William F. Rauchholz
Attorney, Agent, or Firm—Charles J. Ungemach

[57] ABSTRACT

What is disclosed is a preamplifier used with each pyroelectric detector in an infrared imaging array system. To bias the preamplifiers either a MOSFET transistor is utilized as a switch that is periodically operated to place charge on the gate of the MOSFET preamplifier transistor to maintain it at its bias level, or an NPN transistor is operated at a level to provide high impedance. When the bias switch is not operated, the associated detector detects and a reading is taken from each detector in the array. NPN transistor switches can be manufactured consistently and their conduction level can be adjusted to balance the gain of all preamplifiers in the detector array. The supply voltage to the preamplifiers in the array is monitored by a feedback circuit which compares a supply voltage to a reference voltage and adjusts the preamplifier bias voltage to compensate for changes in the supply voltage.

12 Claims, 1 Drawing Sheet

GATE COUPLED INPUT CIRCUIT

BACKGROUND

1. Field of the Invention

This invention relates to an infrared imaging system, and more particularly to a solid state imaging system utilizing pyroelectric detectors in an array.

In our copending applications, Ser. Nos. 912,884 and 912.885, filed on Sept. 26, 1986, and both entitled "Gate Coupled Input Circuit," we disclose and claim alternate embodiments of the invention disclosed herein.

2. Background of the Invention

In the prior art it has been recognized that infrared imaging systems having few or no moving or fragile parts are desirable. Such infrared imaging systems should be very small because detector arrays would be fabricated on a single large scale integrated circuit chip along with associated electronics. Basically, two types of detectors are typically considered for such a solid state infrared imaging system. They are ferroelectric detectors which must be operated above the Curie temperature of the ferroelectric material, as is known in the art, and typically require that the detectors be heated. Above the Curie temperature the ferroelectric detectors have a cubic crystal structure that is very susceptible to polarization, but is not spontaneously polarized as it is below the Curie temperature. Thus, above the Curie temperature ferroelectric detectors require an external electric field in order to generate a signal. The other type of detector is a pyroelectric detector that is operated below its Curie temperature and exhibits a spontaneous dipole moment that produces an internal electric field, so an externally generated electric field is not required for these detectors to work.

In the prior art, infrared imaging systems utilizing ferroelectric detectors have been built. They have separate detector heating means and electric field biasing means for the detectors, and rows of detectors are sequentially enabled and connected to a common preamplifier. These preamplifiers are made up of a combination of integrated circuits and discrete components. The separate field biasing means and separate preamplifiers require increased space and increase the cost of the infrared imaging system.

To minimize circuit cost, a single preamplifier is used to amplify the signal from all detectors in each row of an array of detectors. With this common preamplifier arrangement the fundamental sensitivity limit for each individual detector cannot be achieved.

Other infrared detector array arrangements have been provided in the prior art that do not need to be heated, but they have another problem. They have to be cooled by a cryogenic cooler to temperatures of in the order of 77 Kelvin and below. In addition, such cryogenic cooling arrangements often utilize a bottle of a liquified gas such as nitrogen. This is bulky and the bottle must be changed frequently as the gas is used up.

Thus, there is a need in the art for an infrared imaging system having an infrared detector array that does not have to be heated or cooled (which requires power), does not require separate electric field detector biasing circuits, and does not utilize shared amplifiers.

SUMMARY OF THE INVENTION

The previously described needs of the prior art are met by the present invention. A pyroelectric detector array is utilized that operates well below its Curie temperature so does not require heating or an externally applied electric field. In addition, shared preamplifiers are not used to amplify the output from the detectors. Rather, a preamplifier is manufactured along with each detector of the pyroelectric detector array. Problems of not being able to manufacture discrete resistors of values needed for biasing the integrated preamplifiers are circumvented by biasing or providing a bias impedance by other innovative techniques.

DESCRIPTION OF THE DRAWING

The invention will be better understood upon reading the following detailed description in conjunction with the drawing in which.

DETAILED DESCRIPTION

Pyroelectric detectors are in essence temperature sensitive capacitors having two conductive plates, and the dielectric between the plates is a material such as lithium tantalate which is used in the preferred embodiment of the invention. Lithium tantalate has a Curie temperature of 620 Centigrade, well above the temperature at which the detector is operated. These pyroelectric materials have a dielectric constant that is temperature sensitive. Thus, the detectors are variable capacitors that change capacitance with temperature. Lithium tantalate has a dielectric constant around 43 at room temperature. When these temperature sensitive capacitors (pyroelectric detectors) are placed in an array made up of rows and columns of a large number of detectors and an infrared (IR) image is focused on them by an appropriate IR lens system, the capacitance of each capacitive detector is varied by the intensity of the infrared energy impinging upon the detector. Thus, the voltage across each detector in an array directly represents a part of the infrared image that is focused on the array. When each of the detectors are connected to an amplifier, and the voltage across the detectors is indicated by an electrical signal output from the amplifiers, the output signal from the amplifiers is a representation of the IR image and can be formatted and used to display the infrared image on a raster scan video display.

Figure 1:
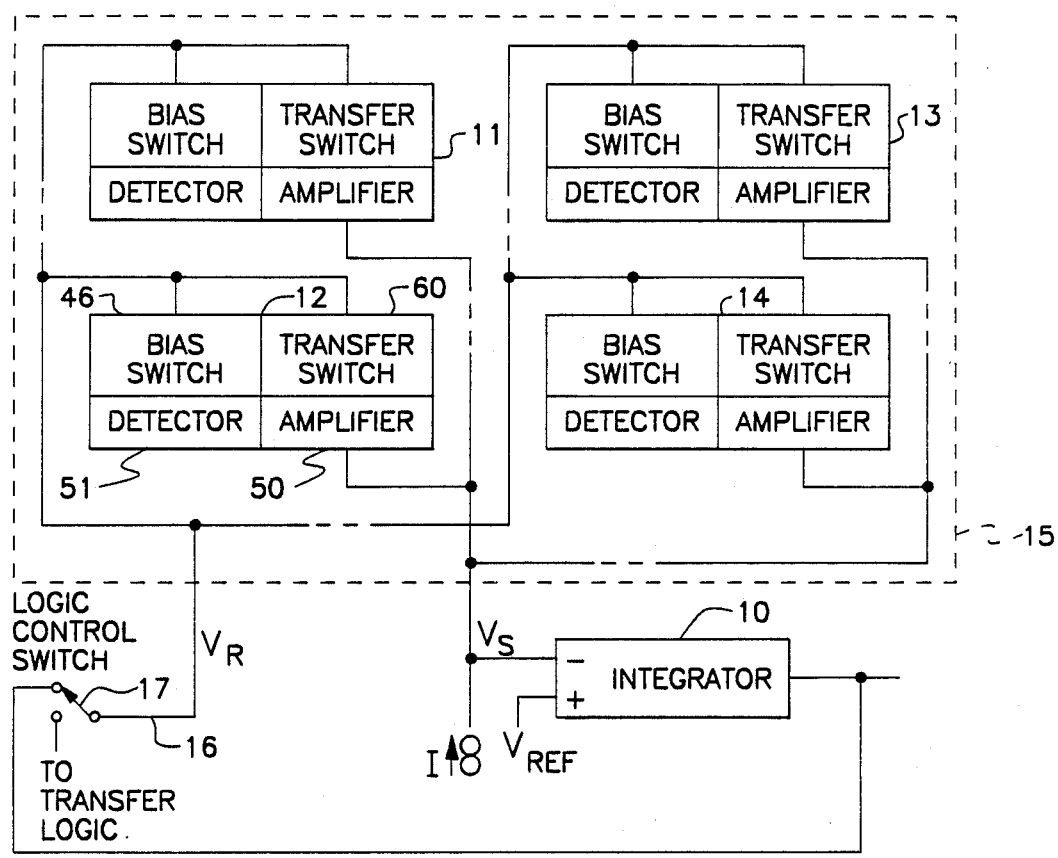
FIG. 1 is a block diagram of an infrared focal plane system utilizing the present invention.
Figure 2:
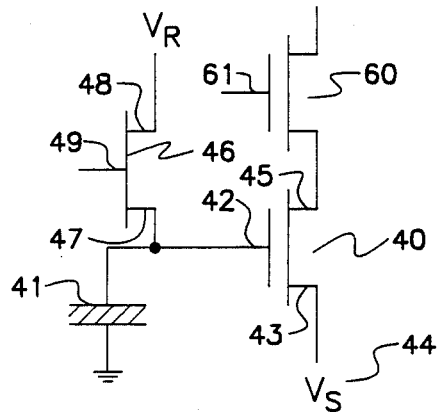
FIG. 2 shows a pyroelectric detector connected to the input of a transistor amplifier and the two of them are biased by using a transistor switch to periodically apply voltage to both the gate of the amplifier transistor and the detector.
Figure 3:
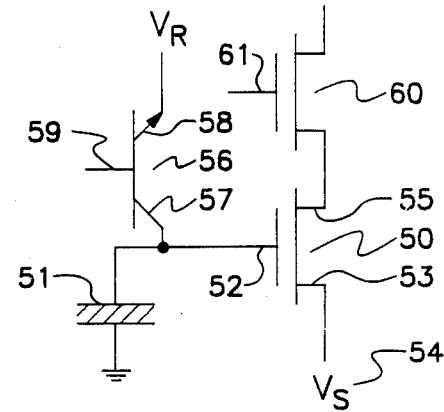
FIG. 3 is an alternative embodiment of the invention also showing a pyroelectric detector connected to the input of an amplifier and the two of them are biased by a transistor that can either be operated as a transistor switch to periodically apply voltage to the gate of the amplifier transistor, or the transistor switch can instead be operated as a variable resistor.

In FIG. 1 is shown a schematic block diagram of an infrared focal plane array system that can provide a raster scan signal representing the infrared image focused on detector array 15. An infrared lens system (not shown) made of germanium or other suitable material is used in a manner well known in the art to focus an infrared image on pyroelectric detector array 15 made up of rows and columns of individual detector array circuits such as represented as circuits 11 through 14. There can actually be thousands of these detector array circuits. Each representative detector array circuit 11 through 14 is made up of four elements each, which are those elements seen in FIGS. 2 and 3 and described in detail further in this specification. With reference to FIG. 3, the bias switch is transistor 56, the transfer switch is transistor 60, the detector is capacitor 51, and the amplifier is transistor 50. However, the alternative embodiment of the detector array circuit shown in FIG. 2 may also be used in place of that shown in FIG. 3.

In representative circuit 12 in FIG. 1, the detector amplifier and the transfer switch are metal-oxide-semiconductor field effect transistors (MOSFET) to the gate input of which is connected the pyroelectric detector. When the circuit of FIG. 2 is utilized in circuits 11 through 14, the bias switch is a bipolar transistor; but when the circuit shown in FIG. 3 is used the bias switch is an NPN transistor and the pyroelectric detector as array 15 is fabricated as a whole.

Also included with detector array 15 in FIG. 1 is a feedback circuit made up of integrator 10 for monitoring the difference between voltages $V_S$ and $V_{Ref}$ and correcting voltage $V_R$ to compensate for such things as temperature changes. When the overall temperature of the system changes, and the change is such to make the source voltage $V_S$ more positive, the feedback circuit in reset integrator 10 forces $V_S$ equal to $V_{Ref}$ by controlling the reset device resistance through voltage $V_R$. $V_{Ref}$ is an estimate of the correct value for $V_S$. For the case where voltage $V_R$ and a control signal at gate 61 of transfer switch 60 are shared, integrator 10 and transfer timing logic circuitry (not shown) time share access to their respective devices which are associated with each detector over a common control lead 16. A logic control switch 17 is used to transfer the access via lead 16 to either integrator 10 or to transfer logic circuitry (not shown) which is used to operate transfer switches 60 in circuits 11 through 14. Since the action of reset integrator 10 is relatively slow, its operation is practically unaffected by the time sharing since the normal off time of the transfer switches 60 in each of circuits 11 through 14 is relatively short. When voltage $V_R$ and control signal 61 are brought out separately, that is they are not shared, the control switch 17 is not necessary and integrator 10 continuously controls voltage $V_R$.

In operation, means that are not shown but are well known in the art, are used for modulating or chopping the infrared image focused on the detector array 15. That is, the image is interrupted at a periodic rate. The purpose that is served is to be able to discriminate between the infrared image signal and various background signals including noise and random temperature change within each of the representative circuits 11 through 14 in detector array 15. A reference signal including only the background signals is obtained from the detectors of array 15 while it has not infrared image focused thereon due to the modulating action, and a sample signal is obtained from the detector when it has an image focused thereon. When the reference signal is subtracted from the sample signal the difference signal is only the image signal which is used to display the infrared image. This modulating technique is used with the two embodiments of the invention described hereinbelow.

In operation of the present invention, the sample signals are actually taken twice before the bias switch transistors are used to reset the bias on the detector amplifiers and on the detectors. This is done to remove uncertainty in the voltage that remains on the detectors and is minimized by operating the bias switch transistors a fewer number of times. This operation is described in greater detail further in this specification.

In FIG. 2 and 3 are shown two alternate embodiments of the invention. Preamplifiers are provided with each pyroelectric detector, and special means for biasing the preamplifiers and the detectors are provided in accordance with the teaching of the present invention. The detectors are periodically exposed to the infrared image focused on the detector array as previously described to get the reference and sample signals which are subtracted from each other as previously described to get the difference or image signal which is used to display the infrared image. In response to be being exposed to the infrared image the capacitance of the detectors changes and thereby changes the voltage at the gate input of the associated preamplifier to thereby change its conduction level. The conduction level of all preamplifiers, each of which reflects the portion of the infrared image focused on the associated detector in detector array 15, is read out in parallel and then converted to a scanning format to create a raster scan video signal of the infrared image focused on the array of detectors. In between being exposed to the infrared image the voltage across the detectors of all detector array circuits 11 through 14 is returned to a quiescent level by use of biasing means or the bias switch and the same read out is again used to obtain the reference signal. As previously described, the reference signal is subtracted from the sample signal to obtain the infrared image signal. The timing circuits used to read out detector array circuits 11 through 14 are not shown herein, but are well known in the art.

FIG. 2 shows one embodiment of the invention for placing a bias charge on gate 42 of MOSFET preamplifier transistor 40 and on capacitive detector 41 for biasing them to their quiescent levels. MOSFET transistor 46 is provided for this purpose. Transistor 46 is connected between a reset voltage supply $V_R$ and gate terminal 42 of preamplifier transistor 40, and transistor 46 is switched on and off periodically by a control signal applied to its gate terminal 49 to apply reset voltage $V_R$ to its gate terminal 42 and to detector 41. As mentioned previously, this is done after every two scan read outs. A charge is thereby placed on gate 42 of transistor 40 and on detector 41 and thereby biases both of them to their quiescent operating point. The charge placed on gate 42 leaks off very slowly due to the high internal impedances of detector 41 and gate 42 of transistor 40. While bias switch transistor 46 is turned off, each time after gate 42 and detector 41 have been recharged to their quiescent point, detector 41 is briefly exposed to a portion of the infrared signal focused on detector array 15. In response thereto the capacitance of detector 41 changes and thereby alters the bias voltage at gate terminal 42. This causes the conduction level of transistor 40 to change. The conduction level of transistor 40 is read out by momentarily placing transfer gate transistor 60 in its conductive state by a signal on its gate 61 in response to a signal from external circuitry that is now shown, but is well known in the art. This is done before transistor 46 is again turned on to reset the bias level of transistor 40 and detector 41. In operation the bias charge on the gate of transistor 40 changes slowly enough that transistor 40 is read out twice before transistor 46 is turned on to reset the bias level of transistor 40. An advantage of this slower resetting of the bias level is that when transistor 46 is turned off there is an uncertainty in the voltage that remains on the detector 41 which is minimized by turning transistor 46 on and off a fewer number of times.

To remove the switch noise caused by the operation of bias switch transistor 46, the sample signals read out of transistor 40 for two consecutive read outs when the infrared image is focused on detector 41 are subtracted from each other. As described in the last paragraph bias switch 46 is only operated before one of these two sample signal read outs, and the subtraction of the sample signal before which there was no bias switch operation from the sample signal before which there was a switch operation will yield the switch noise which can then be removed from the sample signal. This is done because for each of these two consecutive read outs the reset transistor 46 switching noise is constant, and the infrared signal sample is the difference of the two read outs. This technique can be utilized because the rate of change of the gate bias voltage is very slow compared to the read out rate of transistor 40. Thus, the first signal sample read out right after the switch operation is a first read out and the next signal sample read out is a reference signal read out. By subtracting these two read outs the signal-to-noise ratio of the infrared signal of interest is improved by removing the switch noise from the first signal sample.

In operation of a complete IR imaging system, the modulating means, not shown, periodically interrupts the infrared image and bias switch transistor 46 resets the bias voltage to both preamplifier 40 and detector 41 while there is no image focused on the detector. In addition, while there is no infrared image focused on detector 41 the system next reads out the conduction level of preamplifier 40 to determine a reference level which includes miscellaneous circuit noise. Then the modulating means causes the infrared image to impinge on detector 41 and two read out samples are taken that are processed as described in the previous paragraph. The reference level read out is subtracted from the two following sample signal read outs to remove the noise.

FIG. 3 shows the alternate embodiment of the invention for biasing a MOSFET preamplifier transistor 50. A bias switch transistor 56 is provided with every detector 51 that is an NPN transistor rather than a bipolar transistor. This is done because these types of transistors are inherently well matched in manufacture of a large number of them, so their resistance is fairly well constant from transistor to transistor. This is necessary for the large detector array 15. Transistor 56 is periodically operated under control of external circuitry that is not shown but which is well known in the art to periodically reset the bias charge on the gate of the MOSFET preamplifier transistor 50, and at the same time variations in MOSFET preamplifier transistor 50 can also be compensated for by independently setting the on level of transistor 56. This helps to control noise increase in the circuit, because the external circuit can be used to sense temperature changes and compensation can be applied through controlling the on conduction level of transistor 56. In one embodiment of the invention, the bias transistor 56 operates as to have an impedance in the range of $10^{12}$ to $10^{15}$ ohms.

The above described operation of FIG. 2 regarding signal read out and the removal of noise also applies to the operation of FIG. 3 so is not repeated here.

The detector array circuit building block shown in FIG. 3 also includes a transfer gate transistor 60 that is used to read out the conduction level of detector 51 as described above with reference to FIG. 2. However, in FIGS. 3 the emitter and collector of the bipolar transistor 56 may be connected between the gate inputs 52 and 61 of the two MOSFETs 50 and 60 as shown. As previously described, transfer switch 60 is a transistor gate that is well known in the art so it is not described in detail herein, and is operated under control of external circuitry.

In a complete infrared imaging system the drain terminals of transfer gate transistors 60 are each connected to a corresponding tap of a CCD shift register or another type of analog multiplexer. In operation the pyroelectric detectors accumulate signal and thereby set the operation level of their corresponding preamplifier transistor 50. Thus, preamplifier transistor 50 are enabled to be quickly read out in parallel to CCD shift registers (not shown) that are then shifted out at a slower rate to create a scan signal representing the infrared image.

More particularly, initially transfer gate 60 is disabled and transistor 56 is turned on to reset the bias voltage level on the gate 52 of preamplifier 50 and on detector 51. Then reset transistor 56 is turned off or near off and pyroelectric detector 51 is exposed to the infrared image and changes its capacitance in response thereto. After a brief period of detector 51 responding to the infrared image focused on it, transfer gate transistor 60 is momentarily turned on to read out the detector as the conduction level of preamplifier 50.

While what has been described herein are the preferred embodiments of the invention, it will be understood that those skilled in the art may make many changes without departing from the spirit and scope of the invention. For example, while N-channel MOSFETs are disclosed herein, the circuits could be simply modified to operate with P-channel MOSFETs. In addition, other pyroelectric materials may be utilized as the dielectric of the detectors.

What is claimed as the invention is:

1. A circuit for use in a thermal imaging system comprising:
   an infrared detector for detecting an infrared signal impinging thereon,
   an amplifier having an input to which said detector is connected, and an output, said amplifier responding to said detector detecting an infrared signal to provide an amplified electrical signal representing said infrared signal at its output, and
   a bias transistor associated with and connected to the input of said amplifier, said bias transistor being operated to act as a high impedance variable resistor and being used to bias both said detector and said amplifier, said bias transistor normally operating as to have an impedance in the range of $10^{12}$ to $10^{15}$ ohms.

2. The invention in accordance with claim 1 further comprising a transfer switch connected to the output of said amplifier, said transfer switch being operated to read out the amplified electrical signal representing said infrared signal impinging on said detector.

3. The invention in accordance with claim 2 wherein said detector is a temperature sensitive capacitor.

4. The invention in accordance with with claim 3 wherein said detector is a pyroelectric utilizing lithium tantalate as the dielectric.

5. A thermal imaging system upon which an infrared image is focused to be detected and to generate an electrical signal representing said image, said system comprising:

an array of a plurality of infrared detectors upon which said infrared image is focused for detecting said infrared image impinging thereon, said array being organized in rows and columns of closely spaced detectors, an amplifier associated with each of said detectors, each said amplifier having an input to which its associated detector is connected and each amplifier having an output, each said amplifier responding to its associated detector detecting a portion of said infrared image to provide an amplified image at its output, and a bias transistor associated with and connected to the input of each of said amplifiers, said bias transistors being operated to act as variable high impedance resistors and being used to apply a bias voltage to said detectors and said amplifiers, said bias transistors operating as to have an impedance normally in the range of $10^{12}$ to $10^{15}$ ohms.

6. The invention in accordance with claim 5 further comprising a transfer switch connected to the output of each of said amplifiers, said transfer switches being operated to read out the amplified electrical signal representing the portion of said infrared image impinging on each of said detectors.

7. The invention in accordance with claim 6 wherein said detectors are temperature sensitive capacitors.

8. The invention in accordance with claim 7 wherein said detectors are pyroelectric detectors utilizing lithium tantalate as the dielectric.

9. The invention in accordance with claim 5 further comprising means for monitoring a supply voltage supplied to said thermal imaging system and changing said bias voltage to compensate for changes in said supply voltage.

10. The invention in accordance with claim 9 wherein said monitoring means comprises an integrator which compares said supply voltage to a reference voltage and changes said bias voltage to compensate for changes in said supply voltage.

11. A thermal imaging system upon which an infrared image is focused to be detected and to generate an electrical signal representing said image, said system comprising:

an array of a plurality of infrared detectors upon which said infrared image is focused for detecting said infrared image impinging thereon, said array being organized in rows and columns of closely spaced detectors, an amplifier associated with each of said detectors, each said amplifier having an input to which its associated detector is connected and each amplifier having an output, each said amplifier responding to its associated detector detecting a portion of said infrared image to provide an amplified electrical signal representing said portion of said infrared image at its output, a bias switch associated with and connected to the input of each of said amplifiers, said bias switches being periodically operated and applying a voltage to bias their associated amplifier and detector connected thereto to a predetermined bias level, and said switches then being disable to permit said detectors to detect said infrared image impinging on the array of detectors, and means for monitoring a supply voltage supplied to said thermal imaging system and changing said bias voltage to compensate for changes in said supply voltage.

12. The invention in accordance with claim 11 wherein said monitoring means comprises an integrator which compares said supply voltage to a reference voltage and changes said bias voltage to compensate for changes in said supply voltage.

* * * * *